United States Patent [19]

Engle

[11] Patent Number: 4,593,264

[45] Date of Patent: Jun. 3, 1986

[54] TRAILER HITCH SIGNALING DEVICE

[76] Inventor: Edgar R. Engle, 26 Scrafford St., Shippensburg, Pa. 17257

[21] Appl. No.: 543,275

[22] Filed: Oct. 19, 1983

[51] Int. Cl.[4] .............................................. G08B 21/00
[52] U.S. Cl. ................... 340/52 R; 340/687; 280/507
[58] Field of Search .......... 340/687, 52 R, 693; 280/477, 507, 511; 200/302.2

[56] References Cited

U.S. PATENT DOCUMENTS

| | | | |
|---|---|---|---|
| 3,696,371 | 10/1972 | Wise | 340/687 X |
| 3,710,370 | 1/1973 | Quilici et al. | 340/687 X |
| 3,737,605 | 6/1973 | Tobey et al. | 200/302.2 |
| 3,753,117 | 8/1973 | Downing et al. | 340/693 X |
| 3,851,326 | 11/1974 | Costa | 340/571 |
| 3,876,851 | 4/1975 | McMains et al. | 200/302.2 |
| 4,028,691 | 6/1977 | Zeder | 340/687 X |
| 4,127,855 | 11/1978 | Toner | 340/687 |
| 4,211,990 | 7/1980 | Gwozdz | 335/205 |
| 4,315,162 | 2/1982 | Ferguson | 340/693 X |

Primary Examiner—James L. Rowland
Assistant Examiner—Brian R. Tumm
Attorney, Agent, or Firm—Nicholas J. Aquilino

[57] ABSTRACT

A dual trailer hitch warning system for use with a ball and socket trailer hitch including an electrically operated alarm system for signaling a loose coupling of the socket member on the ball member. A switch is mounted within the ball member which energizes an alarm relay circuit when the ball switch operates due to a loose coupling to complete an alarm circuit between the automobile battery and the horn. The warning system also includes a tampering relay circuit adapted to provide an alarm signal if an attempt is made to disengage or short out the alarm circuit or if the socket and ball member are deliberately uncoupled.

1 Claim, 5 Drawing Figures

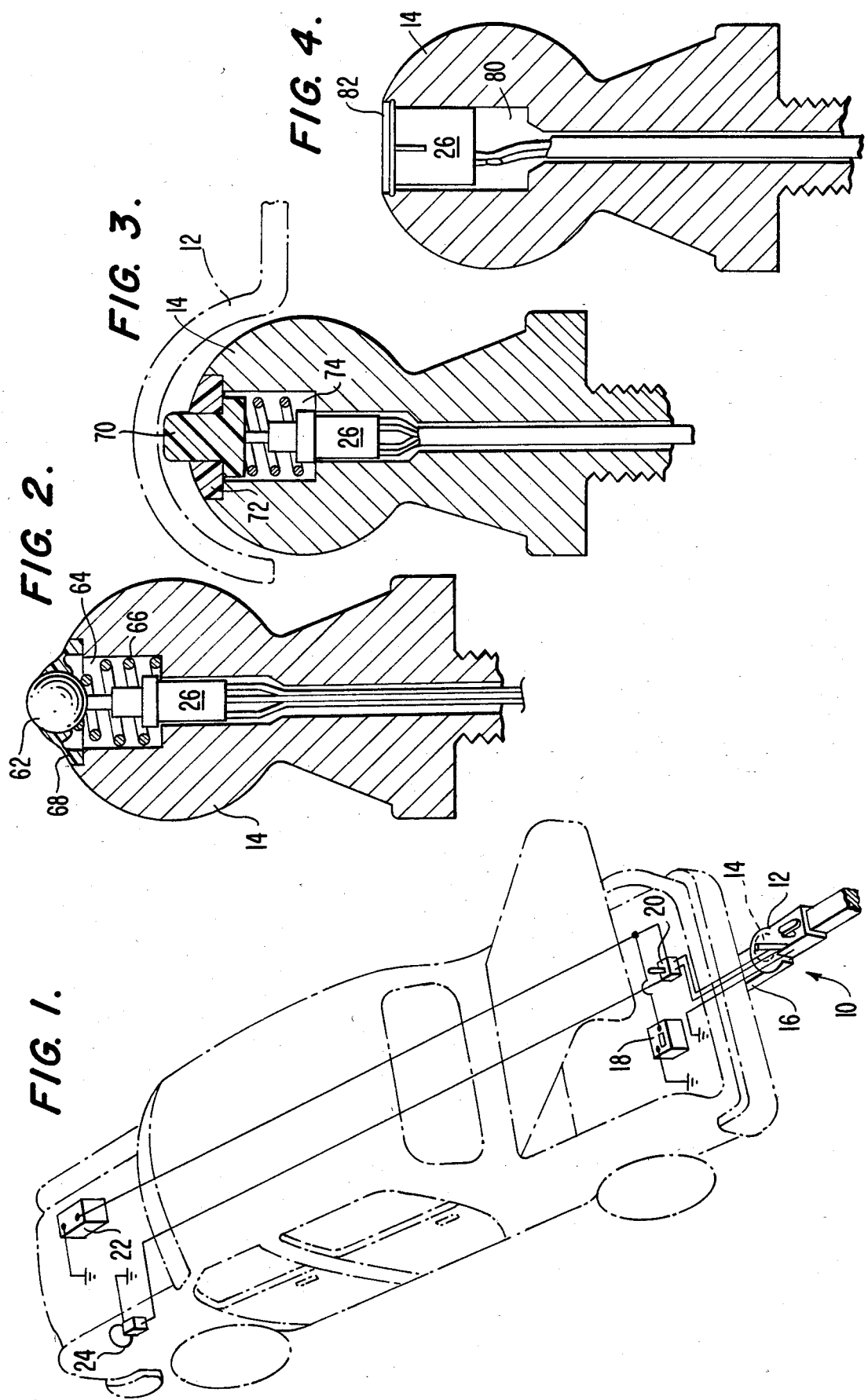

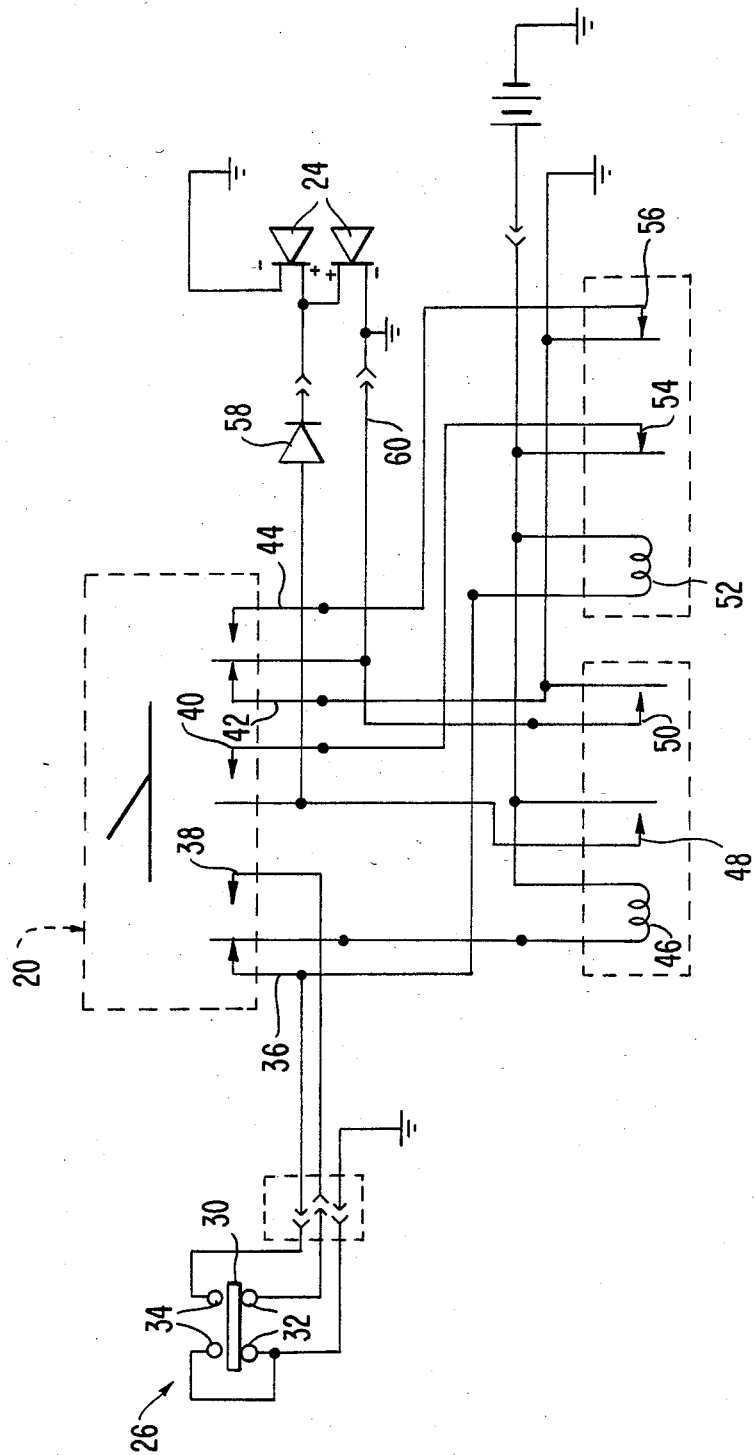

TRAILER HITCH SIGNALING DEVICE

BACKGROUND AND SUMMARY OF THE INVENTION

The present invention relates to an automatic warning system for trailer hitches and, in particular, to an audible warning system which signals the driver of an automobile when the hitch becomes loose or uncoupled and an alarm system which can be used to provide an automatic warning against unauthorized uncoupling of hitched trailer vehicles or attempts to disengage or short-out the alarm circuit. Trailers are conventionally hitched to towing vehicles using a ball and socket hitch-type arrangement. The ball is included as part of an automobile hitch mount secured to the rear of the automobile and cooperates with a cup-shaped coupling member or socket attached to the trailer. A coupling or clamping means secures the socket to the ball while providing maneuverability between the trailer and the towing vehicle. Such coupling devices presently in use on the highways present a potential hazard because of the tendency of the socket to become loose from the trailer ball due to improper coupling or because of rough traveling conditions. Failure of the coupling can result in tragic accidents causing severe injury or death and damage to personal property. Normally, the driver of the vehicle is unaware that the coupling is loose until the coupling actually separates.

Attempts have been made to provide safety features for two vehicles that are hitched by using ball-type couplers having coupler locks and/or chains, but even these are not entirely satisfactory or safe. One example of a visual warning system when an automobile trailer hitch becomes loose is described in Quilici et al. U.S. Pat. No. 3,710,370.

With this background in mind, it is an object of the present invention to provide a warning system for trailer hitches that will provide a signal to the automobile driver when the trailer hitch coupling becomes loose in order that the driver can slow down and pull off the side of the road to check the trouble initiated by the advance warning given before the coupling separates from the ball.

Another object of the present invention is the provision of a dual warning system for trailer hitches in which an audible and/or visible warning is provided when an attempt is made to uncouple the trailer hitch by unauthorized personnel or to disengage the warning system from the automobile battery.

Still another object of the present invention is to provide a dual warning system which is simple in operation and combines both functions of warning of loose ball couplings and unauthorized uncouplings and attempts to disengage the warning system within a compact electronic package.

The present invention provides a warning system for automobile trailer hitches and couplers having a hitch ball with a switch built therein whereby loosening of the coupler from the hitch ball causes actuation of a relay circuit which in turn provides a visual and/or audible alarm signal. The warning system also includes an anti-tampering circuit which provides a visual or audible signal if an attempt to de-energize the circuit is made. The switch may be a pushbutton, toggle snap switch or a magnetic switch which is activated by the coupler resting on the hitch ball in its normal operation position. Preferably, the alarm signal is provided by the vehicle battery and horn which are connected through suitable circuits to the ball switch.

BRIEF DESCRIPTION OF THE DRAWINGS

FIG. 1 shows the trailer hitching warning system of the present invention.

FIGS. 2 and 3 are single pole single throw pushbutton switches.

FIG. 4 is a magnetic switch.

FIG. 5 shows a schematic of the wiring circuit.

DESCRIPTION OF THE PREFERRED EMBODIMENTS

FIG. 1 shows the trailer hitching warning system of the present invention and its relationship to an automobile shown in phantom lines. A trailer hitch 10 includes a socket type coupling member 12 adapted to engage a suitable hitch ball 14 on the end of a hitch mount 16 secured to the rear of an automobile. These parts are conventional. The warning system includes an optional battery 18, which preferably may be mounted in the trunk of the automobile, a three pole double throw control switch 20, the conventional automobile battery 22, and the automobile horn 24. As shown in detail in the embodiments of FIGS. 2, 3 and 4, the ball switch 26 is mounted within the confines of the hitch ball 14 and is actuated and deactuated by the presence or absence of the trailer hitch socket-type coupling member 12.

Various types of ball switches 26 are equally applicable to the present invention. FIGS. 2 and 3 show single pole single throw pushbutton switches of the type manufactured by Grayhill, Inc., part number 46-YY-2163. FIG. 4 shows a magnetic switch including a permanent magnet which bridges a pair of contacts similar to the magnetic switch shown in Gwozdz U.S. Pat. No. 4,211,990.

FIG. 5 shows a schematic of the wiring circuit. The ball switch 26 is preferably a magnetic type as described with reference to FIG. 4 and includes a moveable contact 30 made of magnetic material and adapted to bridge a pair of lower contacts 32 in the at-rest position, and a pair of upper contacts 34 when the coupling member 12 is in place due to the magnetic attraction between the coupling member and the magnetic moveable contact 30. The ball switch 26 is connected to the control switch 20 which is a double throw three pole switch. The first pole includes a normally closed contact 36 and a normally open contact 38. The second pole includes a normally open contact 40, and the third pole includes a normally closed contact 42 and a normally open contact 44. The circuit includes a double pole double throw warning relay 46 having a pair of normally open contacts 48 and 50. The circuit also includes a double pole double throw tampering relay 52 having normally closed contacts 54 and 56. A diode 58 is connected in series with the horn 24 to prevent reverse current flow in this line. In some vehicles, the horn circuit is a two-wire circuit and includes a second line 60 which is shown for clarification of this type of horn circuit only. It will be appreciated that in vehicles where a single-wire horn circuit is used, the line 60 and its associated switching and relay contacts are not necessary for the operation of the alarm.

Referring again to FIGS. 2, 3 and 4, various embodiments of the ball switch 26 are contemplated by the present invention. In FIG. 2, the pushbutton switch 26 actuated by means of a ball type actuator 62 which is mounted within a hollow chamber 64 of the ball 14 and is biased upwardly by means of a spring 66. The actuator 62 is sealed by means of an annular rubber gasket 68 in order to provide a watertight seal between the interior hollow chamber 64 of the ball 14 and the outside environment. Referring to the drawing, the gasket 68 surrounds and grips the actuator 62 and fits into a recess in the upper portion of the ball. When a coupling member 12 is placed on top of the ball 14, the actuator 62 depresses the actuator button of the switch 26 against the bias of the spring 66 to complete the circuit as hereinbelow described.

FIG. 3 shows a similar embodiment of the switch 26 including a pushbutton actuator 70 mounted within an annular insert 72 and fit within the upper portion of a cavity 74 formed in the ball 14. When the coupling member 12 is placed upon the ball, the pushbutton actuator 70 depresses the switch actuator rods to close the circuit.

FIG. 4 shows a ball switch 26 in its preferable form as a magnetic switch which is mounted within a cavity 80 in the ball 14. The switch is sealed within the cavity 80 by means of a nonmetallic disk 82 to provide a seal at this point. As described hereinabove, a magnetic moveable contact 30 is disposed within the switch housing and moveable therewith between the pairs of normally closed contacts 32 and normally open contacts 34. When the coupling member 12 is placed upon the ball 14, the magnetic contact is attracted upwardly by the coupling member to close the circuit as described in greater detail hereinbelow.

The operation of the invention will be described as follows: With the control switch 20 in the neutral position, and the trailer uncoupled, the circuit is open through normally open contact 38 and 48. when the trailer is coupled and coupling member 12 attracts the moveable magnetic contact 30 which completes a circuit from ground through contact 36, warning relay 46 to the battery 22, relay 46 is energized thereby closing contacts 48 and 50 which completes a circuit to the horn to provide a signal. This is an indication that the system is in working order and that it is ready for normal operation.

By switching the control switch 20 to its energized position, normally closed contact 36 is opened to de-energize the relay 46 which in turn opens the horn alarm circuit through contact 48. Contact 40 is closed, contact 42 is opened, and contact 44 is closed.

The system is then ready for operation to provide a signal in the event that the trailer hitch becomes loose or uncoupled either during a towing operation or an attempt is made to uncouple the hitch by unauthorized personnel. Similarly, a warning system is provided in the event an attempt is made to disengage the alarm system or if the wrong size ball is used with the hitch so that the switch is not properly actuated. By way of example, FIG. 3 illustrates a socket type coupling member 12, in phantom, where the coupling member 12 has separated enough from the ball 14 to permit the actuator to be biased away from the switch. It will be appreciated that the embodiments of the ball and switch shown in FIGS. 2 and 4 operate in a similar manner.

When the coupling member 12 separates from the ball for any of the above reasons, either the magnetic contactor or the pushbutton switch moves back to its normal unactuated position. A circuit is then completed between ground, contacts 32, closed contact 38, relay 46 to the battery 22 with relay 46 energized, contacts 48 and 50 are closed and complete a circuit from the battery 22 through the diode 58 to the horn 24 thus providing a warning signal. In the case of a two-wire horn circuit, line 60 is connected to ground through contact 50.

When the trailer is being pulled normally and the coupling member is secure to the ball, the contact 30 is in the upper position thereby energizing tampering relay 52 which maintains contacts 54 and 56 in the open position. Since the warning relay 46 is de-energized at this time, all circuits are open and no signals are given.

If an attempt is made to disengage the alarm system from the trailer by cutting the wires or by disconnecting the connector block between the trailer hitch and the vehicle, the ground is removed from the tampering relay 52 and it is de-energized. Contacts 54 and 56 then close. Contact 54 completes a circuit from the battery 22 through contact 40 of the control switch 20, the diode 58, and the horn 24. Contact 56 establishes a ground path back to the horn circuit.

When an optional battery 18 is provided, it will be appreciated that it is connected in the circuit in parallel with the vehicle battery 22 so that any attempt to disengage the vehicle battery 22 will still provide an alarm circuit when one of the aforementioned situations occur.

It will also be further appreciated that when a pushbutton switch is used instead of the magnetic switch that the same basic switching functions are accomplished.

In addition, the disclosed relay circuits may be interchanged with suitable solid state circuitry without departing from the scope of the invention.

Other additions and modifications may be made to the present invention in keeping within the scope of the following claims.

What is claimed is:

1. A dual warning alarm system for use with a trailer hitch having a trailer socket coupling member and a ball attached to a towing vehicle, said ball member in use being adapted to be received by said trailer socket coupling member for coupling a trailer to said towing vehicle, the improvement comprising:

said ball member having an interior hollow chamber and a smooth watertight exterior surface, power supply means and ground; alarm signal means; a magnetic switch mounted in said hollow chamber and in series with said alarm signal means, said magnetic switch including first normally open and second normally closed pairs of fixed contacts and a moveable magnetic contact for bridging said pairs of fixed contacts, first circuit means connecting a first relay coil, including a first normally open relay contact in series with said first pair of normally open fixed magnetic contacts between said power supply and ground, second circuit means connecting said alarm signal means with said second normally closed fixed magnetic contacts and a second relay contact, in use said first normally open fixed magnetic contacts being bridged by said moveable magnetic contact energizing said first relay coil closing said first normally open relay contacts de-energizing said alarm signal means when said ball and socket coupling member are connected, said alarm signal means being energized upon de-energizing of said first relay coil upon disconnection of said ball and said socket coupling member; third circuit means including a second relay coil, having a third normally open relay contact, in series with said first normally open fixed magnetic contacts, said power supply and ground, said third normally open relay contact in series with said alarm signal means whereby loss of ground of said second relay coil completes a circuit through said power supply means and said alarm signal means.

* * * * *